United States Patent
Stephenson (12)

(10) Patent No.: US 6,389,743 B1
(45) Date of Patent: May 21, 2002

(54) TREE SUPPORTING SYSTEM

(76) Inventor: Grant L. Stephenson, 5321 1/2 Westpark, Houston, TX (US) 77056

( * ) Notice: Subject to any disclaimer, the term of this patent is extended or adjusted under 35 U.S.C. 154(b) by 0 days.

(21) Appl. No.: 09/708,340

(22) Filed: Nov. 8, 2000

(51) Int. Cl.[7] .............................................. A01G 17/14
(52) U.S. Cl. ........................................................ 47/43
(58) Field of Search ............................ 47/42, 43, 32.4, 47/32.5, 32.6; 248/523

(56) References Cited

U.S. PATENT DOCUMENTS

| | | | | |
|---|---|---|---|---|
| 936,824 | A | * 10/1909 | Simpson et al. | ............... 52/163 |
| 5,159,780 | A | * 11/1992 | Molthen | ......................... 47/70 |
| 6,301,830 | B1 | * 10/2001 | Whipple | ......................... 47/43 |

* cited by examiner

*Primary Examiner*—Charles T. Jordan
*Assistant Examiner*—Francis T. Palo
(74) *Attorney, Agent, or Firm*—Kenneth A. Roddy

(57) ABSTRACT

A tree supporting system includes a non-elastic flexible tree collar belt which encircles the tree trunk with movable belt loops thereon, adjustable cables attached at one end to the loops, and ground anchors at the other end that are driven lengthwise into the ground and pulled into a flat transverse position in the ground. The belt and the belt loops are formed flat non-elastic webbing. The belt loops having an upper loop eye at an upper end slidably mounted on the belt and a lower loop eye at a lower end sized and shaped to receive an end of the cable. A cam type or ratchet type cinching buckle on the belt allows passage of one end of the belt therethrough for tightly cinching the belt about the circumference of the tree trunk and releasably grips the belt in the encircled position. The belt loops are selectively spaced apart in circumferential relation to one another on the belt in its encircled position prior to cinching it about the tree trunk and are secured against the circumference of the tree trunk in the circumferentially spaced relation when it is cinched and gripped by the buckle. Each ground anchor is driven into the ground in an upright position to the desired depth by a driving rod. The driving rod is removed, and the cable is then pulled upward to rotate the anchor until it is positioned transverse to the hole formed when it was driven into the ground. The cables extend radially outward and downward from the belt loops to the ground anchors to support the tree trunk from selected directions.

8 Claims, 3 Drawing Sheets

TREE SUPPORTING SYSTEM

BACKGROUND OF THE INVENTION

1. Field of the Invention

This invention relates generally to tree supporting means, and more particularly to a tree supporting system that includes a non-elastic flexible belt which encircles the tree trunk with movable belt loops thereon, adjustable cables attached at one end to the loops, and ground anchors at the other end that are driven lengthwise into the ground and pulled into a flat transverse position in the ground.

2. Brief Description of the Prior Art

It has been customary for a long period of time when planting trees to drive one or more stakes into the ground and extend wires or cables between the trunk of the tree and the stakes. In some installations, elongate stakes are driven vertically into the ground fairly close to the tree, and the wires or cables are extended at appropriate elevations between the trunk of the tree and the stakes. Usually the portions of the wire or cable that extend around the trunk of the tree are covered by sections of rubber hose and the like.

In other installations, when planting tall trees, it is customary to drive a number of stakes into the ground at suitable distances radially spaced from the tree and extend guy wires between the trunk of the tree and the stakes, the wires and stakes being arranged in circumferentially spaced relation around the tree to afford rigid support thereto. Examples of this type of installation are illustrated in: Fletcher, U.S. Pat. No. 1,051,208, June, U.S. Pat. No. 3,040,477, and Fox, U.S. Pat. No. 4,319,428. These patents utilize either cables or rods which extend between hooks or loops in the opposite ends of the wires or rods.

Foresight Products, LLC, of Commerce City, Colo. manufactures a tree support system utilizing a ground anchor known as the "duckbill anchor" which is attached to a tree collar by a cable with a turnbuckle, however, this system requires a separate tree collar for each ground anchor and each tree collar is a length of cable covered by a section of rubber hose that extends around the trunk of the tree. The Foresight ground anchors are shown and described in U.S. Pat. Nos. 4,044,513 and 4,802,317, which are hereby incorporated by reference to the same extent as if fully set forth herein.

A major disadvantage of the Foresight tree support system and other tree support systems that utilize a plurality of wires or cables covered by rubber hose that are wrapped around a portion of the tree is that the wire or cable positioned in the hose tends to create undue pressure on the tree which can seriously stunt the growth of the tree.

The present invention is distinguished over the prior art in general, and these patents in particular by a tree supporting system that includes a non-elastic flexible tree collar belt which encircles the tree trunk with movable belt loops thereon, adjustable cables attached at one end to the loops, and ground anchors at the other end that are driven lengthwise into the ground and pulled into a flat transverse position in the ground. The belt and the belt loops are formed flat non-elastic webbing. The belt loops having an upper loop eye at an upper end slidably mounted on the belt and a lower loop eye at a lower end sized and shaped to receive an end of the cable. A cam type or ratchet type cinching buckle on the belt allows passage of one end of the belt therethrough for tightly cinching the belt about the circumference of the tree trunk and releasably grips the belt in the encircled position. The belt loops are selectively spaced apart in circumferential relation to one another on the belt in its encircled position prior to cinching it about the tree trunk and are secured against the circumference of the tree trunk in the circumferentially spaced relation when it is cinched and gripped by the buckle. Each ground anchor is driven into the ground in an upright position to the desired depth by a driving rod. The driving rod is removed, and the cable is then pulled upward to rotate the anchor until it is positioned transverse to the hole formed when it was driven into the ground. The cables extend radially outward and downward from the belt loops to the ground anchors to support the tree trunk from selected directions.

SUMMARY OF THE INVENTION

It is therefore an object of the present invention to provide a tree supporting system that includes a non-elastic flexible belt formed of webbing which is releasably buckled around the trunk of a tree and has movable webbing belt loops thereon which will not damage the surface of the tree or create undue pressure which would mar or stunt the growth of the tree.

It is another object of this invention to provide a tree supporting system that includes a non-elastic flexible belt formed of webbing which is releasably buckled around the trunk of a tree and has webbing belt loops slidably mounted thereon which allow selective circumferential spacing relative to one another to afford optimum support thereto from selected directions.

Another object of this invention is to provide a tree supporting system that includes a non-elastic flexible belt formed of webbing which is releasably buckled around the trunk of a tree and has webbing belt loops slidably mounted thereon in combination with adjustable length cables attached at one end to the belt loops and ground anchors at their other ends.

Another object of this invention is to provide a tree supporting system that includes, in combination, a non-elastic flexible belt formed of webbing which is releasably buckled around the trunk of a tree with circumferentially adjustable webbing belt loops thereon and adjustable length cables attached thereto with ground anchors at their outer ends that are driven lengthwise into the ground beneath the surface and pulled into a flat transverse position in the ground to afford greater holding strength and resistance to pull stress loads than conventional stakes driven into the ground.

Another object of this invention is to provide a tree supporting system that includes, in combination, a non-elastic flexible belt formed of webbing which is releasably buckled around the trunk of a tree with circumferentially adjustable webbing belt loops thereon and cables attached thereto, each with a turnbuckle to allow selective tensioning of the cables to afford optimum support thereto from selected directions.

Another object of this invention is to provide a tree supporting system that is attractive in appearance and has no upstanding stakes that may cause injury to persons or lawn care equipment.

A further object of this invention is to provide a tree supporting system that can be easily and quickly installed and properly adjusted by unskilled labor.

A still further object of this invention is to provide a tree supporting system that is simple in construction, inexpensive to manufacture, and rugged and durable in use.

Other objects of the invention will become apparent from time to time throughout the specification and claims as hereinafter related.

The above noted objects and other objects of the invention are accomplished by a tree supporting system that includes a non-elastic flexible tree collar belt which encircles the tree trunk with movable belt loops thereon, adjustable cables attached at one end to the loops, and ground anchors at the other end that are driven lengthwise into the ground and pulled into a flat transverse position in the ground. The belt and the belt loops are formed flat non-elastic webbing. The belt loops having an upper loop eye at an upper end slidably mounted on the belt and a lower loop eye at a lower end sized and shaped to receive an end of the cable. A cam type or ratchet type cinching buckle on the belt allows passage of one end of the belt therethrough for tightly cinching the belt about the circumference of the tree trunk and releasably grips the belt in the encircled position. The belt loops are selectively spaced apart in circumferential relation to one another on the belt in its encircled position prior to cinching it about the tree trunk and are secured against the circumference of the tree trunk in the circumferentially spaced relation when it is cinched and gripped by the buckle. Each ground anchor is driven into the ground in an upright position to the desired depth by a driving rod. The driving rod is removed, and the cable is then pulled upward to rotate the anchor until it is positioned transverse to the hole formed when it was driven into the ground. The cables extend radially outward and downward from the belt loops to the ground anchors to support the tree trunk from selected directions.

DESCRIPTION OF THE PREFERRED EMBODIMENT

Figure 1:
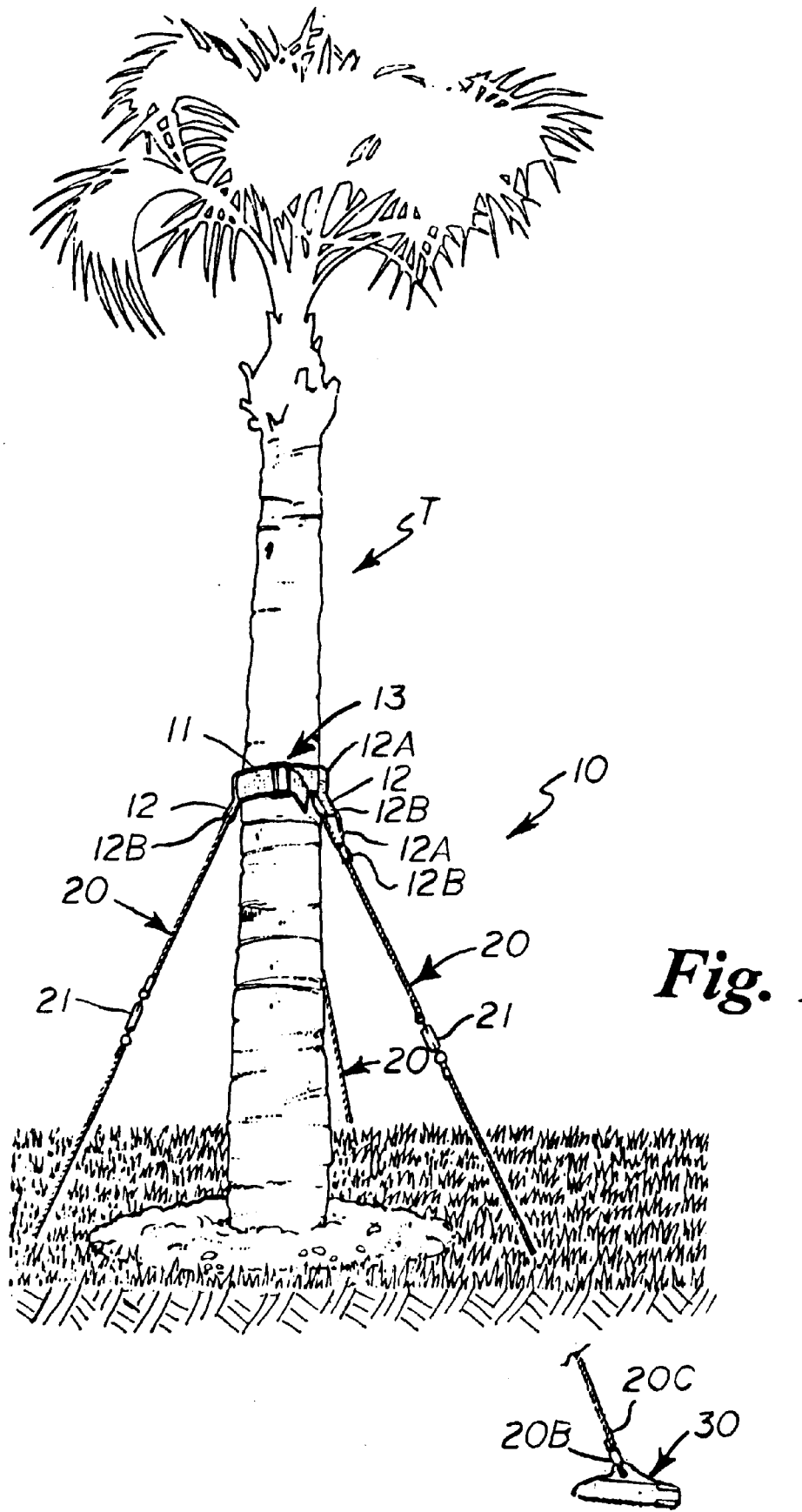
FIG. 1 is an elevation view of a palm tree supported by the tree supporting system in accordance with the present invention.

Referring to the drawings by numerals of reference there is shown in FIG. 1, a palm tree T supported by the tree supporting system 10 in accordance with the present invention. As described in more detail hereinafter, the tree supporting system 10 includes a flexible belt 11 with movable belt loops 12 thereon which encircles the tree trunk and is secured by a cinching buckle 13, cable assemblies 20 having a first end attached to the movable belt loops 12 and ground anchors 30 at a second end which are driven lengthwise into the ground and pulled into a flat transverse position to firmly anchor them in the ground. Each cable assembly 20 has a turnbuckle 21 connected intermediate its first and second ends for adjusting its length and the tension in the cable.

Figure 2:
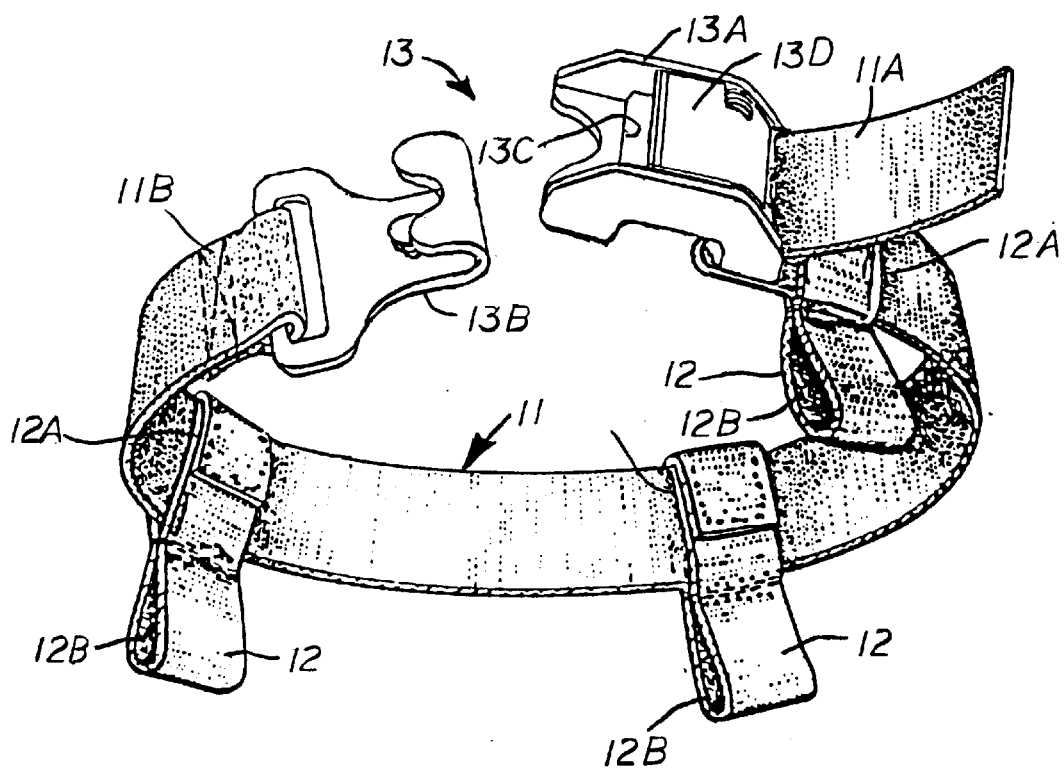
FIG. 2 is a perspective view of the flexible belt member of the tree supporting system having a cam buckle.

As shown in FIG. 2, the flexible belt 11 and the belt loop members 12 are formed of webbing. Each belt loop member 12 is folded and stitched to form a first loop eye 12A in its upper end and a second loop eye 12B in its lower end. The loop eyes 12A at the upper ends of the belt loops 12 are slidably received on the belt 11. In a preferred embodiment for trees having a caliper of up to 30", the belt 11 and belt loops 12 are formed of 1" wide, 2 ply 6000 lb. nylon webbing, and three loops are provided. In the embodiment of the cinching buckle 13 illustrated in FIG. 2, one end 11A of the belt 11 passes through a cam type buckle 13A and a quick-connect hook 13B is secured to the other end of the belt. The hook 13B is connected into an aperture 13C at one end of the buckle body. The cam buckle 13A has a spring biased cam member 13D which, when depressed, is moved to a non-gripping position to allow sliding passage of the belt through the buckle, and when released assumes a gripping position to tightly grip the belt. The belt 11 is tightly cinched about the tree trunk by manually pulling its free end 11A through the cam buckle 13A. A suitable quick-connect hook and cam buckle unit is commercially available from Ancra International LLC, Erlanger, Ky.

Figure 3:
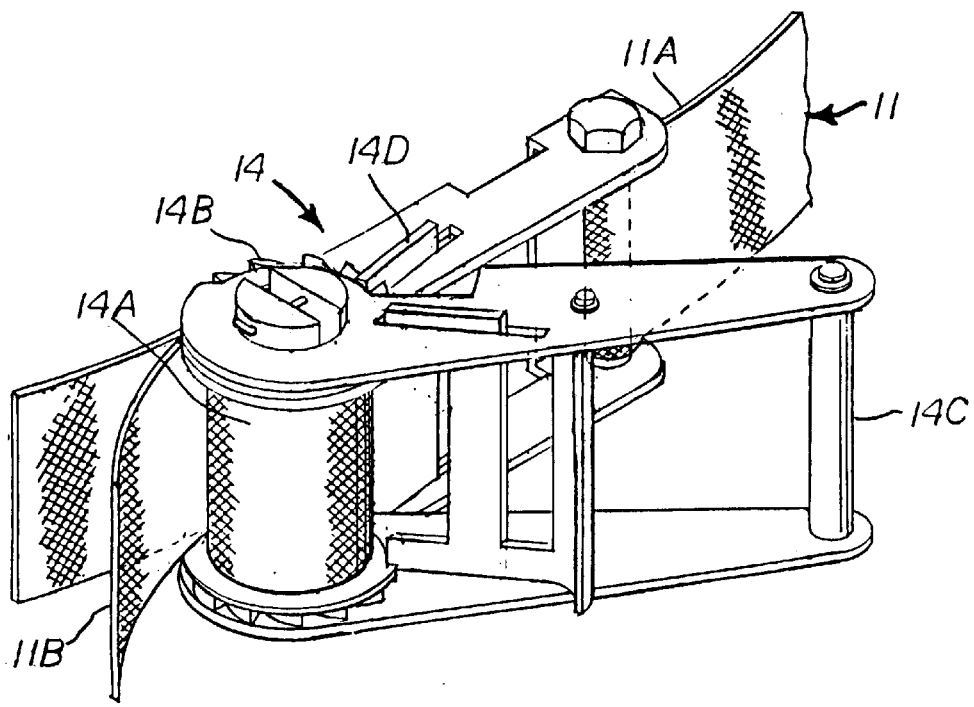
FIG. 3 is a perspective view of an alternate ratchet buckle.

In a preferred embodiment for larger trees having a caliper of up to 60", the belt 11 and loops 12 are formed of 2" wide, 2 ply 12000 lb. nylon webbing, and three or four loops are provided. As shown in FIG. 3, in the embodiment for larger caliper trees, one end 11A of the belt 11 is secured to a ratchet type buckle 14 and its free end is received through, and wound on, the reel member 14A of the ratchet buckle. The ratchet buckle 14 has a toothed ratchet wheel 14B fixed at each end of the reel 14A to rotate therewith, a lever member 14C pivotally connected to the buckle body and engaged with the ratchet wheels to manually rotate the ratchet wheels and reel, and a spring biased retractable latch plate 14D for releasably latching the ratchet wheels and reel when not being rotated. The free end 11B of the belt 11 is gripped and wound on the reel 14A and the belt is tightly cinched about the tree trunk by manually operating the lever 14C. A suitable ratchet buckle is commercially available from Ancra International LLC, Erlanger, Ky.

It should be understood that the cam buckle 13A and the ratchet buckle 14 are commercially available and therefore are not shown and described in complete detail.

Referring again to FIG. 1, the preferred cable assemblies 20 are made of galvanized steel aircraft cable and may be coated with clear, white, or orange vinyl. The first end 20A of each cable assembly 20 is looped through the lower loop eye 12B of each belt loop member 12, respectively, and secured with a conventional cable clamp 20B. The turnbuckles 21 are commercially available zinc plated eye and eye type turnbuckles with a ⅜" thread diameter.

Figure 4:
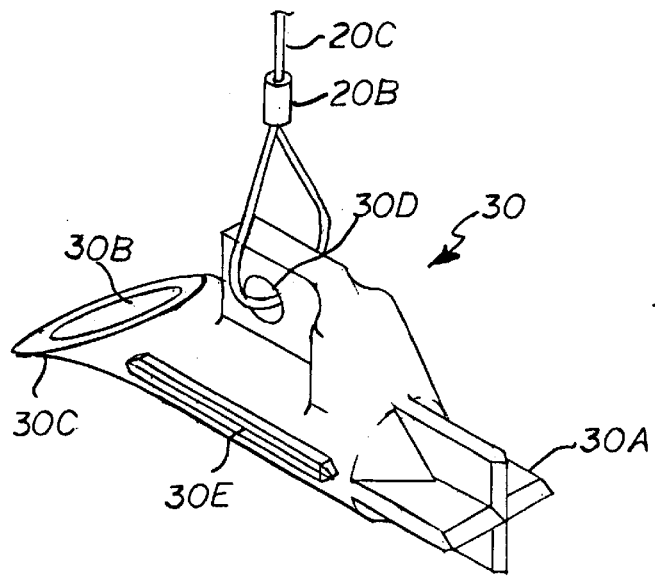
FIG. 4 is a perspective view of the ground anchor member of the tree supporting system.
Figure 5:
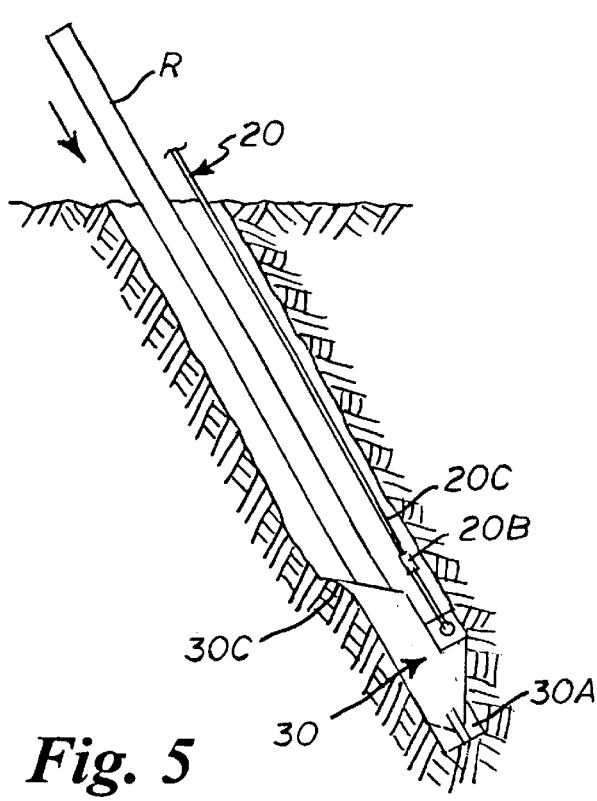
FIGS. 5 and 6 are side elevations showing the ground anchor being driven into the ground, and then rotated about its lip to positioned it transverse to the hole into which it was driven, respectively.
Figure 6:
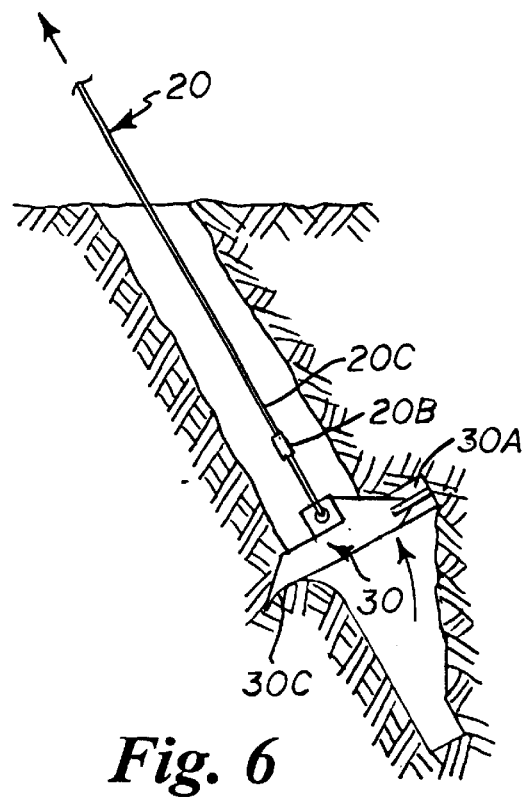

Referring now to FIGS. 4, 5, and 6, the second end 20C of each cable assembly 20 is secured to a ground anchor 30 by a cable clamp 20B. A suitable ground anchor known as the "duckbill anchor" is commercially available from Foresight Products, LLC, Commerce City, Colo. The Foresight ground anchors are shown and described in U.S. Pat. Nos. 4,044,513 and 4,802,317, which are hereby incorporated by reference to the same extent as if fully set forth herein. Therefore the ground anchors are not shown and described in complete detail.

The ground anchor 30 is a rigid metal tubular member having an enclosed cruciform star point leading driving end 30A and an open trailing end 30B with an out-turned lip 30C on one side thereof and a cable eyelet 30D intermediate its ends on the side opposite the lip side and positioned rearwardly of the center of mass of the member. Lateral ribs or wings 30E extend a short distance outwardly along opposed sides of the anchor member. As shown somewhat schematically in FIG. 5, a driving rod R is inserted into the ground anchor 30 through its open end 30B and the anchor is driven into the ground in an upright position to the desired depth. As shown in FIG. 6, the driving rod is removed, and the cable 20 is then pulled upward to rotate the anchor 30 about its lip 30C until it is positioned transverse to the hole formed when it was driven into the ground.

While this invention has been described fully and completely with special emphasis upon preferred embodiments, it should be understood that within the scope of the appended claims the invention may be practiced otherwise than as specifically described herein.

What is claimed is:

1. A tree collar belt for attaching guy wires between a tree trunk and ground anchors, the belt comprising:

a flat non-elastic flexible belt of sufficient length to encircle a tree trunk and having a first and a second end;

a plurality of belt loops, each having an upper end slidably mounted on said belt and having a lower end sized and shaped to receive an end of a guy wire; and a cinching buckle means on said belt first end structured to allow passage of said belt second end therethrough for tightly cinching said belt about the circumference of the tree trunk and further structured to releasably grip said belt in the encircled position about the tree trunk;

said belt loops being selectively spaced apart in circumferential relation to one another on said belt in its encircled position prior to cinching said belt about the tree trunk and secured against the circumference of the tree trunk in said circumferentially spaced relation by said belt when said belt is cinched and gripped by said buckle; wherein each said belt loop lower end provides a point of attachment of a free end of a respective guy wire anchored at its other end radially outward from the tree trunk to support the tree trunk from selected directions.

2. The tree collar belt according to claim 1, wherein said belt and said belt loops are formed of webbing material.

3. The tree collar belt according to claim 2, wherein each said belt loop is folded and stitched to form a first loop eye at its said upper end and a second loop eye at its said lower end, said loop eye at said upper end sized to be slidably received on said belt, and said loop eye at said lower end sized to allow an end of a guy wire to be looped therethrough.

4. The tree collar belt according to claim 1, wherein said cinching buckle means comprises a buckle connected to said belt first end and having a cam member movable between a non-gripping position to allow sliding passage of said belt second end through said buckle and a gripping position to tightly grip said belt second end.

5. The tree collar belt according to claim 1, wherein said cinching buckle means comprises: a ratchet buckle connected to said belt first end and having a rotatable reel through which said belt second end is passed and wound; ratchet means connected with said reel to rotate therewith; pivotal lever means for manually rotating said ratchet means and said reel; and latch means for releasably latching said ratchet and said reel when not being rotated; and said belt second end being gripped and wound on said reel and said belt being tightly cinched about the tree trunk by operating said lever means.

6. A tree supporting system, comprising in combination:

a flat non-elastic flexible tree collar belt of sufficient length to encircle a tree trunk and having a first and a second end, a plurality of belt loops each having an upper end slidably mounted on said belt and having a lower end sized and shaped to receive an end of a cable;

a cinching buckle means on said belt first end structured to allow passage of said belt second end therethrough for tightly cinching said belt about the circumference of the tree trunk and further structured to releasably grip said belt in the encircled position about the tree trunk; and a plurality of cables each having a first end attached to a respective said belt loop lower end and having a ground anchor at a second end; wherein said belt loops are selectively spaced apart in circumferential relation to one another on said belt in its encircled position prior to cinching said belt about the tree trunk and are secured against the circumference of the tree trunk in said circumferentially spaced relation by said belt when said belt is cinched and gripped by said buckle; and each said ground anchor is driven into the ground radially outward from the tree trunk and said cables extend radially outward and downward from said belt loop lower ends to support the tree trunk from selected directions.

7. The combination according to claim 6, wherein each of said cables has adjustable tensioning means connected between its said first end and its said second end for adjustably increasing or decreasing the length and tension of the respective said cable.

8. The combination according to claim 6, wherein each said ground anchor comprises a rigid metal tubular member having an enclosed cruciform star point leading driving end; an open trailing end with an out-turned lip on one side thereof, and a cable eyelet positioned intermediate its said ends rearwardly of the center of mass of said member on the side opposite the lip side, and through which a respective said cable second end is secured; and each said ground anchor is driven into the ground in an upright position to a desired depth by a driving rod inserted into its said open trailing end, and thereafter the driving rod is removed and the respective said cable secured thereto is pulled upward to rotate said ground anchor about its said lip until it is positioned transverse to the hole formed thereby when it was driven into the ground.

* * * * *